(12) United States Patent
Srinivasachar

(10) Patent No.: US 8,840,706 B1
(45) Date of Patent: Sep. 23, 2014

(54) CAPTURE OF CARBON DIOXIDE BY HYBRID SORPTION

(76) Inventor: Srivats Srinivasachar, Sturbridge, MA (US)

( * ) Notice: Subject to any disclaimer, the term of this patent is extended or adjusted under 35 U.S.C. 154(b) by 0 days.

(21) Appl. No.: 13/478,184

(22) Filed: May 23, 2012

Related U.S. Application Data

(60) Provisional application No. 61/519,533, filed on May 24, 2011.

(51) Int. Cl.
*B01D 53/02* (2006.01)

(52) U.S. Cl.
USPC .............................................. 95/139; 96/108

(58) Field of Classification Search
CPC ............ B01D 53/1475; B01D 53/504; B01D 2258/0283; B01D 2251/30; B01D 2251/302; B01D 2251/304; B01D 2251/306; B01D 2251/606; B01D 2252/204
USPC ........................................................... 95/139
See application file for complete search history.

(56) References Cited

U.S. PATENT DOCUMENTS

| | | | | |
|---|---|---|---|---|
| 3,068,627 | A * | 12/1962 | Sherwood | 95/37 |
| 6,125,655 | A * | 10/2000 | Millet et al. | 62/641 |
| 6,670,304 | B2 * | 12/2003 | Chang | 502/418 |
| 7,097,925 | B2 * | 8/2006 | Keefer | 429/9 |
| 2007/0037702 | A1 * | 2/2007 | Prichett et al. | 502/415 |
| 2011/0293509 | A1 * | 12/2011 | Cobden et al. | 423/655 |
| 2012/0003722 | A1 * | 1/2012 | Polak et al. | 435/257.1 |
| 2012/0160099 | A1 * | 6/2012 | Shoji et al. | 95/139 |

OTHER PUBLICATIONS

Herzog, H. Meldon, J.,et al. "Advanced Post-Combustion CO2 Capture," report prepared for Clean Air Task Force, under a grant from Doris Duke Foundation (Apr. 2009).
Radosz, M. et al. "Flue-Gas Carbon Capture on Carbonaceous Sorbents: Toward a Low-Cost Multifunctional Carbon Filter for "Green" Energy Producers," (Apr. 29, 2008), American Chemical Society.
Siriwardane, Ranjani, et al. "Adsorption of CO2 on Molecular Sieves and Activated Carbon" U.S. Department of Energy, pp. 668-670.
Sjostrom, S., et al, "Evaluation of solid sorbents as a retrofit technology for CO2 capture", Fuel, vol. 89 , Jun. 2010, pp. 1298-1306.
Nelson, Thomas, et al. "The Dry Carbonate Process: Carbon Dioxide Recovery from Power Plant Flue Gas", Annual NETL CO2 Capture Technology for Existing Plants R&D Meeting, Mar. 24-26, 2009, Pittsburgh, Pennsylvania.

* cited by examiner

*Primary Examiner* — Christopher P Jones
(74) *Attorney, Agent, or Firm* — Brian M. Dingman; Dingman, McInees & McLane, LLP

(57) ABSTRACT

A composition, process and system for capturing carbon dioxide from a combustion gas stream. The composition has a particulate porous support medium that has a high volume of pores, an alkaline component distributed within the pores and on the surface of the support medium, and water adsorbed on the alkaline component, wherein the proportion of water in the composition is between about 5% and about 35% by weight of the composition. The process and system contemplates contacting the sorbent and the flowing gas stream together at a temperature and for a time such that some water remains adsorbed in the alkaline component when the contact of the sorbent with the flowing gas ceases.

24 Claims, 14 Drawing Sheets

CAPTURE OF CARBON DIOXIDE BY HYBRID SORPTION

CROSS-REFERENCE TO RELATED APPLICATION

This application claims priority of Provisional Application Ser. No. 61/519,533 filed on May 24, 2011, the disclosure of which is incorporated herein by reference.

GOVERNMENT RIGHTS

The disclosed technology was developed under SBIR/STTR Contract number DE-SC0004476 issued by U.S. Department of Energy. The US government has certain rights herein.

FIELD

This disclosure relates to the capture of carbon dioxide from combustion exhaust.

BACKGROUND

Many commercial post-combustion carbon dioxide ($CO_2$) capture plants use chemical absorption processes with amine-based (e.g., mono-ethanolamine (MEA)) solvents. Others, such as the Benfield process, use carbonates (hot potassium carbonate solution) as a $CO_2$ scrubber solvent. In a typical process, flue gas contacts the scrubber solution in an absorber. The solution selectively absorbs the $CO_2$. $CO_2$-laden scrubber solution is then transferred to a stripper. In the stripper, the $CO_2$-rich solution is heated to release almost pure $CO_2$. The $CO_2$-lean solution is then recycled to the absorber. Concerns about degradation and corrosion have kept the solvent strength relatively low (typically 20-30% by weight) in practical systems, resulting in relatively large equipment sizes and energy requirements and high solvent regeneration costs.

Adding a $CO_2$ capture and compression system to a power plant reduces its overall thermal efficiency significantly, by one estimate up to 24%.

The efficiency reduction is due to the additional parasitic energy load from the $CO_2$ capture system. The parasitic load can be broken down into three components:
(i) energy (steam) to break the chemical bonds between the $CO_2$ and the amine and to raise the temperature of the amine solution to the operating temperature of the stripper (~60% of parasitic load),
(ii) $CO_2$ compression (~33%) for pumping; and
(iii) energy (electricity) to push the flue gas through the absorber (~5%).

Existing amine-based liquid chemical absorption systems have a number of disadvantages including high parasitic steam loss due to solvent regeneration, sensitivity to sulfur oxides and oxygen, solvent loss due to vaporization, and high capital and operating costs.

An alternate process for $CO_2$ capture is the use of solid sorbents. Solid sorbents may have advantages because of potentially less energy requirements compared to solvent capture, as the heat capacity of the solid carrier is several times lower than the water in the MEA-based solvent. Solid sorbents for low temperature carbon capture and storage include those that are carbon-based, zeolites, supported amines and carbonate-based. Each of these classes of sorbents has advantages and disadvantages. Carbon-based sorbents, which would fall in the physical adsorbent category, have a low energy for regeneration (<10 kJ/mol $CO_2$). However, the $CO_2$ capacity is also low, and more sorbent must be heated during regeneration. Zeolites rely on their structure to act as a molecular sieve for gases. While zeolites exhibit superior capability to remove $CO_2$ from dry simulated flue gas, in the presence of moisture, their adsorption capacity is significantly diminished because of preferred adsorption of water vapor.

Other solid sorbents that have been investigated are supported amines. Most of these materials contain approximately 40-50 weight percent amines; polyethyleneamine is a specific example. The substrates include silica, clay and other high surface area supports. Heat of regeneration for the best amine-based sorbents are between 2000 and 3500 kJ/kg $CO_2$ (~90-150 kJ/mol $CO_2$) and working capacity is between 3-9 weight percent. All the materials exhibit a slow loss in capacity, in part, to reaction with $SO_2$ to form heat-stable salts, but also due to physical loss of the active component.

The reaction inherent to this process is as follows:

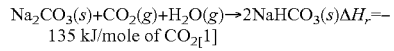

$$Na_2CO_3(s) + CO_2(g) + H_2O(g) \rightarrow 2NaHCO_3(s) \Delta H_r = -135 \text{ kJ/mole of } CO_2 \quad [1]$$

Sodium carbonate captures $CO_2$ in the presence of water vapor to form sodium bicarbonate at temperatures around 60° C. By performing a moderate temperature swing to 120 to 140° C., the bicarbonate decomposes and releases a $CO_2$/steam mixture that can be converted into a pure $CO_2$ stream by condensation of steam. There are however, significant challenges with processes based on dry solid carbonate sorbents:
1. The $CO_2$ sorption process above is strongly exothermic and requires significant cooling. Reaction equilibrium is negatively impacted if adsorption reactor temperatures are not controlled.
2. The regeneration (reverse) reaction is strongly endothermic and has a large energy penalty (130-140 kJ/mole of $CO_2$).
3. The released water vapor from the regeneration step has to be condensed to separate it from the $CO_2$. This energy of condensation needs to be recovered and re-used to reduce the overall energy penalty.
4. The $CO_2$ loading capacity of the solid sorbent must be increased to lower the large solids handling and circulation requirements.

SUMMARY

Given the shortcomings of the state-of-the-art, and in order to reduce costs for $CO_2$ capture and sequestration, there is a need for improved $CO_2$ sorption materials and methods to use those materials. In one aspect the disclosure herein includes a $CO_2$-sorbent composition that results in reduced energy of $CO_2$ adsorption compared to dry carbonate sorbents and amine-based solvents. The $CO_2$-sorbent composition can enable faster rate of $CO_2$-capture reaction than dry carbonate sorbents. The $CO_2$-sorbent composition can employ a reactor design with lower or no cooling requirements compared to dry carbonate sorbent. The $CO_2$-sorbent composition can increase the utilization of the active $CO_2$-sorption component in the sorbent. The $CO_2$-sorbent composition can have suitable characteristics including sufficient mechanical strength and attrition resistance for use in a moving bed, fluidized bed, or transport reactor without significant sorbent loss during operation due to sorbent degradation.

In another aspect the disclosure herein includes a method for using the $CO_2$-sorbent in a system and process for capturing and separating $CO_2$ from a $CO_2$-laden gas stream, regenerating the sorbent for re-use in the adsorption-desorption process, while releasing the $CO_2$ during desorption step as a substantially pure component.

In yet another aspect the disclosure herein includes a system for using the $CO_2$-sorbent for capturing and separating $CO_2$ from a $CO_2$-laden gas stream, regenerating the sorbent for re-use in the adsorption-desorption process, while releasing the $CO_2$ during desorption step as a substantially pure component.

The disclosed sorbent, method and system may include one or more of the following:

A. A hybrid sorbent that is able to capture $CO_2$ from flue gases containing $CO_2$. The hybrid sorbent comprises the following components (i) Active alkaline components that react with $CO_2$; (ii) Adsorbed water that enables the active alkaline components to react with $CO_2$ with low heats of reaction, but limited so that the sorbent is maintained as a flowable powder; (iii) optional promoters to enhance the reactivity of the alkaline component portion in the hydrated alkaline component; (iv) Porous, attrition-resistant support with large pore volumes with large capacity for active components and to increase reactivity by uniformly dispersing the active components; and (v) optional binders to impart strength to the final sorbent particle.

B. Adsorber operation in which water is added to the sorbent prior to introduction to the adsorber to enable self-regulation of sorbent temperatures during $CO_2$ adsorption step. The process includes the use of the hydrated sorbent. The process may be accomplished by using prior art dry sorbents and adding the requisite amount of water to achieve the hydrated sorbent and process conditions.

C. Regenerator operation that preserves the "hydrated" form of the sorbent to ensure low heats of dissociation for $CO_2$ release from the sorbent particles.

Hybrid Sorbent Composition

In one example the sorbent includes hybrid sorbent particles that are a composite, with physical and chemical functionalities required to meet the above-identified objectives, and comprising the following:

a. An active alkaline component that when combined with water reacts with $CO_2$ but with low heats of reaction; examples are alkali carbonates (e.g., $Na_2CO_3$, $K_2CO_3$), bicarbonates (e.g., $NaHCO_3$, $KHCO_3$), mixed carbonate-bicarbonate (e.g., trona), and hydrates (e.g., potassium carbonate hydrate-$K_2CO_3.1.5H_2O$). Other examples are amines (e.g., mono-ethanolamine, di-ethanolamine) and ammoniated compounds (e.g. piperazine) and amine functionalities covalently bonded to the support (see d.).

b. Water (adsorbed) that, in combination with the alkaline component, results in increased rates of adsorption of $CO_2$ from the gas stream and lower heats of adsorption reaction compared to the case when it (adsorbed water) is absent, but in a limited quantity so that the sorbent is maintained as a flowable powder that is sufficiently flowable such that it remains essentially un-agglomerated when contacted with the $CO_2$ laden gas stream as described herein, e.g., in a fluidized bed reactor.

c. A promoter to activate the alkali component; for example, one or more of amines, piperazine, and alkali carbonates, and that are complementary to the active alkaline components by increasing rate of adsorption and desorption of $CO_2$ by the sorbent.

d. Porous, attrition-resistant support material for the active alkaline component, water and promoters; examples include porous silica, zirconia, titania, char, activated lignite char, activated carbon e. A binder, to impart strength to the final sorbent particle; examples include bentonite, clay, lime, sodium silicate, pozzolanic compounds such as calcium silicates and Portland cement, as well as organic-based binders such as lignosulfonates, polyvinyl alcohol, methyl cellulose, polyethylene glycol, organic resins and starch.

More detail as to these five components is as follows:

Support Material:

The support material used to make the functional sorbent particles should have high pore volume to provide space for incorporation of the active alkaline material within the internal porosity of the support particles, and high specific surface area to distribute the active alkaline material so as to minimize bulk diffusion resistance for the $CO_2$ reaction. A pore volume greater than 0.5 $cm^3$ per gram of support material is preferred, if functional sorbent particles are formulated directly using the support material of a similar particle size distribution. More preferably, the pore volume of the support material is greater than 0.9 $cm^3$ per gram, if the functional sorbent particles are formulated directly using the support material of a similar particle size distribution. Examples for the support material are activated carbon, coal char, biomass char, porous silica, porous zirconia, alumina, titania, and clays such as bentonite. A specific example for the support material is lignite-derived activated carbon from NORIT-Americas with pore volume of 0.95 $cm^3$ per gram and internal surface area of about 500-600 $m^2$ per gram. Another example for the support material is charcoal that has slightly lower surface area (~300 $m^2$ per gram) than activated carbon but similar porosity as a high surface area carbon. An example of this material is Activated HOK lignite from RWE in Germany. High porosity/surface area inorganic materials (e.g. clays, titania, silica, alumina, aluminosilicates, and zirconia) can also be used as a support material for the active alkaline component.

Preferably, the support material is of a composition such that it does not chemically interact with the active alkaline component in the range of operating conditions (adsorption and desorption) that the sorbent will be used, and will thus enable the sorbent to retain activity over multiple cycles. An example of support material that does not chemically interact with the active alkaline components during the $CO_2$ adsorption and desorption is porous carbon.

The average particle size of the functional sorbent particles can be between about 100 microns and 2000 microns. The functional sorbent particles may be formulated directly using the support material of a similar particle size distribution. Alternatively, the functional sorbent particles may be formulated by agglomerating smaller primary support material particles. The particle size distribution of such primary support material (which can be agglomerated to make functional sorbent particles with an average diameter of 100 to 2000 microns) is preferably smaller than 44 microns, with mean size around 20 microns. More preferably, the particle size distribution of the primary support material is smaller than 25 microns, with mean size smaller than about 10 microns. Even more preferably, the particle size distribution of the primary support material is smaller than 10 microns, with mean size smaller than about 5 microns. The desired particle size distribution for the primary support material particles may be obtained, in part, by dry or wet grinding commercially available support material. The primary support material particles may also be obtained by crystallization from a solution or a sol-gel process, such as in the case of zirconia. In such a case, the size of the primary particles are smaller than about 1 micron, preferably nano-sized, and would not be expected to have significant porosity. The porosity of the functional sorbent particles is achieved as a result of agglomerating these primary support material particles. The primary support particles can be combined together with the other components to make functional agglomerated sorbent particles that are sized between 100 and 2000 microns.

Active Alkaline Component:

Active alkaline components that react with $CO_2$ but with low heats of reaction are the best choices. A preferred active alkaline component is potassium carbonate. Other active alkaline components include sodium carbonate and/or the hydrate carbonates of potassium and sodium. Bicarbonates of sodium and potassium as well as mixed carbonate-bicarbonate-hydrates (e.g. trona) are also potential candidates for the active alkaline component; during the regeneration step of the first few cycles of usage, the carbonate form will form from the bicarbonate-containing materials, and the sorbent will adsorb $CO_2$ during subsequent cycles. Amines and other ammoniated compounds such as piperazines are also candidate active alkaline components for $CO_2$ adsorption.

Preferably, the active alkaline component is distributed uniformly within the pores and on the surfaces of the support material. This may be achieved by dissolving the active alkaline component in water or other solvent, slurrying the support material particles in that solution, blending and grinding the slurry mixture for example using a wet mill (as an option), atomizing the slurry into droplets, and drying the droplets (spray drying) to achieve the desired functional sorbent particles (agglomerates). The dried functional sorbent particles may, as an option, be subjected to additional heating to between 300 to 600° C. to increase the strength of the functional sorbent particles and to lower their attrition index. The weight percent of the active alkaline component in the final functional sorbent mixture is preferably between 20 and 70 percent, more preferably between 30 and 50 percent.

Water Component:

Another component of the functional sorbent particles is adsorbed water. The adsorbed water, in combination with the alkaline component, fosters increased rates of adsorption of $CO_2$ from the gas stream and lowers the heats of adsorption reaction compared to the case when it (adsorbed water) is absent. The proportion of water in the final functional sorbent particles is adjusted to a value such that the bulk sorbent is maintained as a flowable powder but maximized to achieve higher rates of $CO_2$ adsorption, higher adsorption capacities within one cycle, and lower heats of adsorption. Preferably, the proportion of water in the functional sorbent particle is between about five and about thirty-five (5-35) weight percent. More preferably, the proportion of water in the functional sorbent particles is between 10 and 20 weight percent. A portion of the water is preferably associated with the active alkaline component as a hydrate. For example a portion of the water may be associated with potassium carbonate (active alkaline component) as carbonate hydrate ($K_2CO_3.1.5H_2O$).

The water associated with active alkaline components will preferably result in a lower heat of adsorption of the $CO_2$ than the dry sorbent. Preferably, the heat of adsorption of the hybrid sorbent herein is below 60 kJ/mole of CO2 adsorbed; in contrast the heat of adsorption of the prior art dry carbonate sorbent is around 130-140 kJ/mole of CO2 adsorbed. More preferably, the heat of adsorption of the hybrid sorbent herein is below about 40 kJ/mole of $CO_2$ adsorbed, which can be achieved by increasing the proportion of adsorbed water in the functional sorbent particle of the hybrid sorbent.

The water component may be added to the sorbent particles prior to use in the process by contacting them with a water spray. Alternatively, the water component may be added by condensing steam onto colder sorbent particles.

The presence of adsorbed water in the hybrid sorbent particles is beneficial for both $CO_2$ adsorption and desorption. During $CO_2$ adsorption, maintaining a proportion of the water in the sorbent particles can be achieved by controlling the temperature, residence time, and water vapor partial pressure to which the sorbent particles are exposed, ensuring that particles are not fully dried out at the outlet of the adsorption reaction chamber. These partially dried out particles may be rehydrated prior to re-introduction to the adsorber. In the regenerator, the amount of water evaporated should be minimized, as this constitutes additional energy penalty. This is achieved by controlling the temperature of the regeneration step and the partial pressure (as well as total pressure) of the water vapor in the environment surrounding the sorbent particle during regeneration. A higher total pressure enables a higher partial pressure for the water vapor, which allows a higher temperature of operation for the regenerator and facilitates desorption of $CO_2$ from the $CO_2$-laden sorbent particles.

Promoter:

A small amount of promoter added to the active alkaline component can be used to enhance the performance of the sorbent particles in their ability to capture $CO_2$. When alkali carbonate is used as the major active alkaline component, addition of an amine or compounds with nitrogen-containing functional groups as a minor component is preferred. For example, a preferred embodiment contains piperazine as promoter in combination with potassium carbonate as the active alkaline component. Piperazine may be combined with water to form a solution and added to the support material (e.g. activated carbon). The active alkaline component (e.g. potassium carbonate) can be added prior to, in combination with, or subsequent to the addition of the piperazine solution to the support material. The support material containing the piperazine and active alkaline component is then dried (e.g., via spray drying) to form the functional sorbent particles. The molar ratio of active alkaline component to promoter is preferably greater than about 2 (e.g., molar ratio of K+/piperazine>2). More preferably, the molar ratio of active alkaline component to promoter is preferably greater than about 4.

Binder:

One or more binders can be added to the slurry containing the primary sorbent support particles, active alkaline component, and promoter. The binder is added to impart strength to the final sorbent particle (agglomerate) formed from the spray drying of the atomized slurry. Examples of binders include bentonite, clay, lime, and sodium silicate, pozzolanic compounds such as calcium silicates and Portland cement, as well as organic-based binders such as lignosulfonates, polyvinyl alcohol, methylcellulose, polyethylene glycol, organic resins, and starch.

DESCRIPTION OF EXAMPLES

Figure 1:
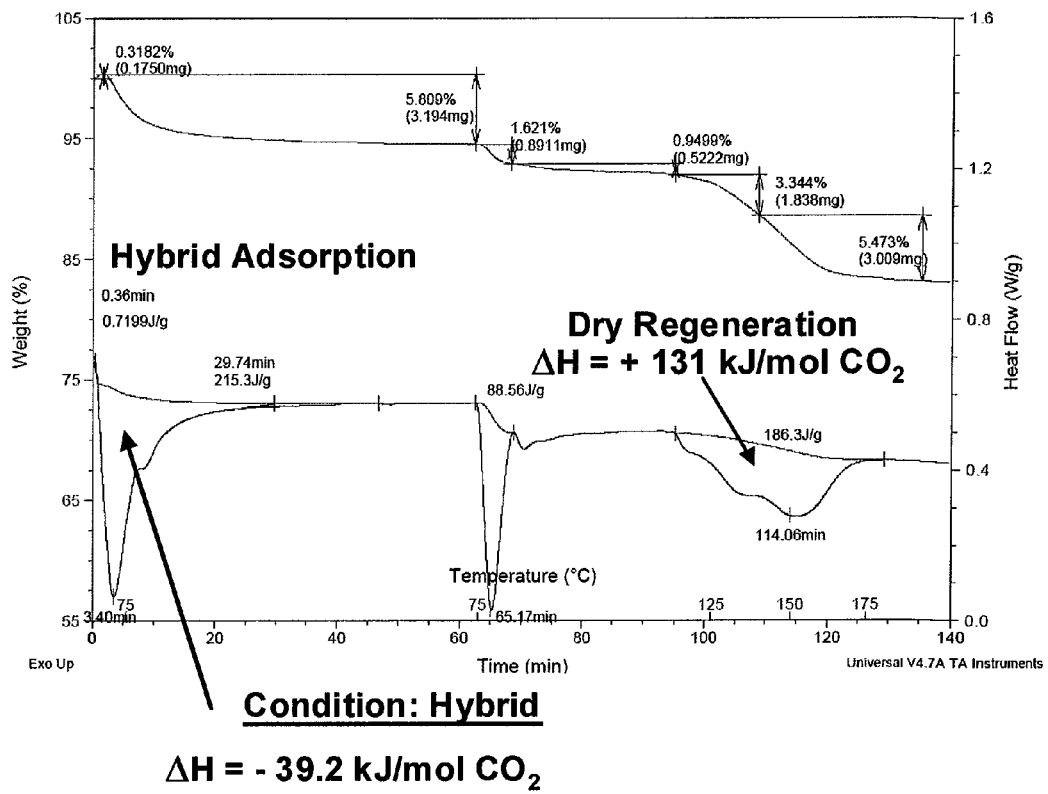
FIG. 1 details comparisons of results from an example of the subject hybrid process (FIG. 1A) and a prior art dry sorption process (FIG. 1B).
Figure 1:
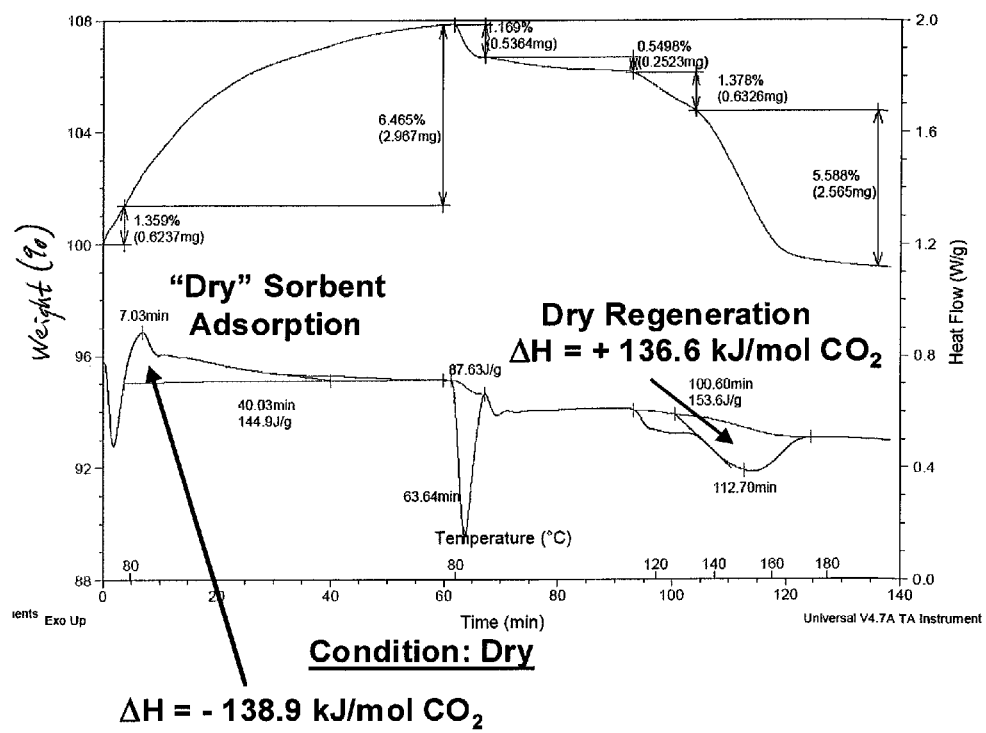

Selected properties of an example of the sorbent for the hybrid sorption process are discussed below (see Table 1):

True Density: The true density of the sorbent can be measured using analytical methods such as helium pycnometry. An example sorbent has activated carbon as the support material and potassium carbonate as the active alkaline component. The true density of this example sorbent material is about 2000 $kg/m^3$.

Bulk Density: Sorbent samples were oven dried overnight at 105° C. A portion of the sample was then filled into a 50 mL graduated cylinder and the subsequent weight was noted. The bulk density was measured to be between 475 and 600 $kg/m^3$. The bulk density of the preferred sorbent is between 400 and 700 $kg/m^3$, more preferably between 600 and 700 $kg/m^3$.

Average Particle Diameter: The average particle diameter of a sorbent sample was around 1 mm. The preferred sorbent material has particle size that is consistent with its use in the adsorption and desorption reactors and is between 0.1 and 2.0 mm. The reactors are expected to be of a fluidized bed, transport (entrained flow) or moving bed design.

Packing Density/Surface area: In the example sorbent, the surface area of the support material before impregnation was 500 $m^2/g$ and after impregnation about 120-180 $m^2/g$.

Solid Heat Capacity: The heat capacity of the example sorbent is estimated to be about 1 kJ/(kg.° C.)

Attrition Index: Attrition index is evaluated using ASTM D 5757-95 test method. The attrition index is the amount of fines generated over a fixed time period per the above method as a percent of the original sample, when exposed to conditions of fluidization and inter-particle interactions per the above test method. The preferred sorbent is expected to have an attrition index below about 20%, more preferably below about 5%, and most preferably below about 1.0%.

Adsorption

Pressure: The adsorption pressure of $CO_2$ in equilibrium with the sorbent is the partial pressure of carbon dioxide present in a flue gas stream and contacted with the sorbent. This is expected to be from about 0.1 to about 0.15 atm. for flue gas from a coal-fired boiler. The adsorber will be operated at very slightly above atmospheric pressure.

Temperature: The adsorption temperature in the example use of the sorbent was at 70° C. During testing, it was noted that since the reaction was exothermic, the reactor set-point could not be held at the set-point of 70° C., but as the moisture evaporated the reaction temperature was able to be self-regulated at approximately 75° C. The adsorption temperature was then taken as about 75° C.

Equilibrium loading: The equilibrium loading was estimated using data derived from a thermo-gravimetric analyzer/differential scanning calorimeter (TGA/DSC) analysis. The moles of $CO_2$ adsorbed were estimated by heating the $CO_2$—laden sorbent up to a temperature of 200° C. It was then assumed that the mass loss from the sorbent was a combination of equimolar amounts of water and $CO_2$ determined using the TGA. The extent of reaction was used to determine the moles of $CO_2$ that reacted during the adsorption process. The equilibrium loading in the example sorbent was determined to be 2.9 moles of $CO_2$ per kg of initial active sorbent.

Heat of adsorption: The heat of adsorption was arrived at from measurements conducted using a TGA/DSC. The heat of adsorption resulting from sorbent reaction with $CO_2$ was measured to be between −5 and −60 kJ/mol of $CO_2$ for the range of initial adsorbed water contents of the hybrid sorbent.

Desorption

Pressure: The adsorption pressure of $CO_2$ in equilibrium with the sorbent was estimated as the partial pressure of carbon dioxide present in the regenerated gas stream. This value was also estimated from heat and mass balances generated using ASPEN Plus™ simulations of the CACHYS process (presented later). The sorbent and gas mixture exiting the regenerator are under a pressure of approximately 7 bar. The mole fraction of $CO_2$ in the gas stream was approximately 0.5, therefore its partial pressure was estimated to be 3.5 bar.

Temperature: The regenerator conditions used in the example operation was between 140-160° C. The reverse reaction of adsorption is endothermic and needs addition of heat to allow for sorbent regeneration and $CO_2$ release. Results from fixed bed reactor testing indicated that as the regenerator was held under pressure and direct steam introduced to heat up the sorbent, at the above bed temperatures, the $CO_2$ was fully released.

Equilibrium loading: Using measured data from the fixed bed reactor, the $CO_2$ was desorbed under pressure and approximately 65% of the adsorbed $CO_2$ was released. The preferred equilibrium loading after the desorption step is targeted to be less than 10% of the adsorbed $CO_2$ (i.e., greater than 90% of the adsorbed $CO_2$ is released during desorption)

Heat of desorption: Similar to adsorption, the heat of desorption is between 5 and 60 kJ/mol of $CO_2$

TABLE 1

State-Point Data for Hybrid Sorbent Process

| | Units | Measured/Estimated Performance | Projected Performance |
|---|---|---|---|
| Sorbent | | | |
| True Density @ STP | $kg/m^3$ | 2.1 | 2.1 |
| Bulk Density | $kg/m^3$ | 475-650 | 600-700 |
| Average Particle Diameter | mm | 1.0 | 0.1-2.0 |
| Particle Void Fraction | $m^3/m^3$ | 0.4 | 0.4 |
| Packing Density | $m^2/m^3$ | N/A | N/A |
| Solid Heat Capacity @ STP | kJ/kg-K | 1.02 | 1 |
| Crush Strength | $kg_f$ | N/A | N/A |
| Attrition Index | — | N/A | <0.5% |

TABLE 1-continued

State-Point Data for Hybrid Sorbent Process

|  | Units | Measured/Estimated Performance | Projected Performance |
|---|---|---|---|
| Adsorption |  |  |  |
| Pressure ($CO_2$ partial pressure) | Bar | 1(0.13) | 1 |
| Temperature | °C. | 50-80 | 50-80 |
| Equilibrium Loading | g mol $CO_2$/kg | 2.9 | 3.5 |
| Heat of Adsorption | kJ/mol $CO_2$ | 20-60 | 0-60 |
| Desorption |  |  |  |
| Pressure ($CO_2$ partial pressure) | Bar | 1-7 (0.5-3.5) | 1-7 |
| Temperature | °C. | 140-160 | 130-170 |
| Equilibrium Loading | g mol $CO_2$/kg | 0.3-1.0 | 0.2-0.5 |
| Heat of Desorption | kJ/mol $CO_2$ | 20-60 | 0-60 |

Sorbent Utilization, Thermodynamics and Heats of Reaction:

The sorbent is used herein under semi-dry/moist conditions within the sorbent particles. An atmospheric thermogravimetric analyzer/differential scanning calorimeter (TGA/DSC) was used to evaluate the effect of moisture in the sorbent on both the extent of carbonate material utilization and the heat of reaction.

The TGA/DSC system was first calibrated. The measurement system was then validated by testing for water evaporation and establishing that the heat of vaporization was equal to the theoretical value. The next set of experiments simulated the hybrid adsorption step of the inventive process (sorbent with moisture and water vapor in gas) followed by a "dry" desorption step. FIG. 1 details comparisons of results from an example of the subject hybrid process (FIG. 1A) and a prior art dry sorption process (FIG. 1B).

The sorbent used in this set of testing was prepared by impregnating potassium carbonate solution into activated carbon followed by a drying step. The activated carbon comprised about 1 mm diameter particles. The weight percent of the impregnated potassium carbonate was about 50 weight percent (dry basis). Different amounts of initial sorbent moisture were obtained by adding different quantities of water to the above sorbent preparation to achieve sorbent moisture contents ranging from about 5 percent to 40 percent by weight.

The temperature program for the TGA/DSC testing consisted of rapidly heating up to the adsorption temperature (~70° C.), holding for a period of time, then rapidly heating to 110° C. and holding (to eliminate remainder of moisture), then slowly heating (~2° C./min) to 200° C. The gas introduced into the system was a mixture of $CO_2$ and nitrogen in a fixed proportion saturated with water vapor at room temperature. During the first temperature step (increase and hold), the $CO_2$ reacted with the water and the carbonate to a bi-carbonate. Simultaneously, the remainder portion of the water evaporated (FIG. 1A). The former is a weight gain and an exothermic reaction. The latter is a weight loss and an endothermic reaction. During the final slow heating step, there is no moisture in the system and the bicarbonate formed in the previous portion of the experiment is decomposed. From this weight loss the amount of $CO_2$ that was originally captured and the percentage of the carbonate that participated in the adsorption step can be calculated. Also, the heat of reaction can be calculated. With the same sample, a "dry" adsorption step (only water vapor in gas) and "dry" desorption step was performed so as to contrast the energetics of this prior art process to the subject process.

Figure 2:
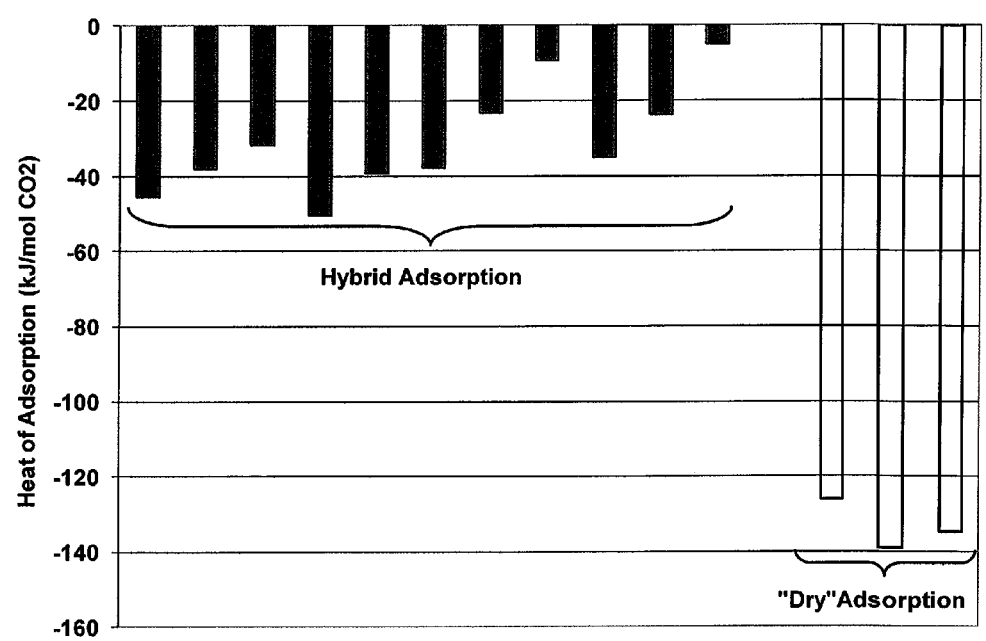
FIG. 2 illustrates heats of adsorption for hybrid adsorption and "dry" adsorption tests performed at multiple temperatures (50, 70, and 85° C.) and various initial sorbent moisture contents.

The hybrid adsorption and "dry" adsorption tests were performed at multiple temperatures (50, 70, and 85° C.) and various initial sorbent moisture contents. In all cases, the heat of adsorption with the hybrid sorbent was mostly below −60 kJ/mol $CO_2$, while with the "dry" sorbent it was about −120 to −140 kJ/mol $CO_2$ (see FIG. 2).

Figure 3A:
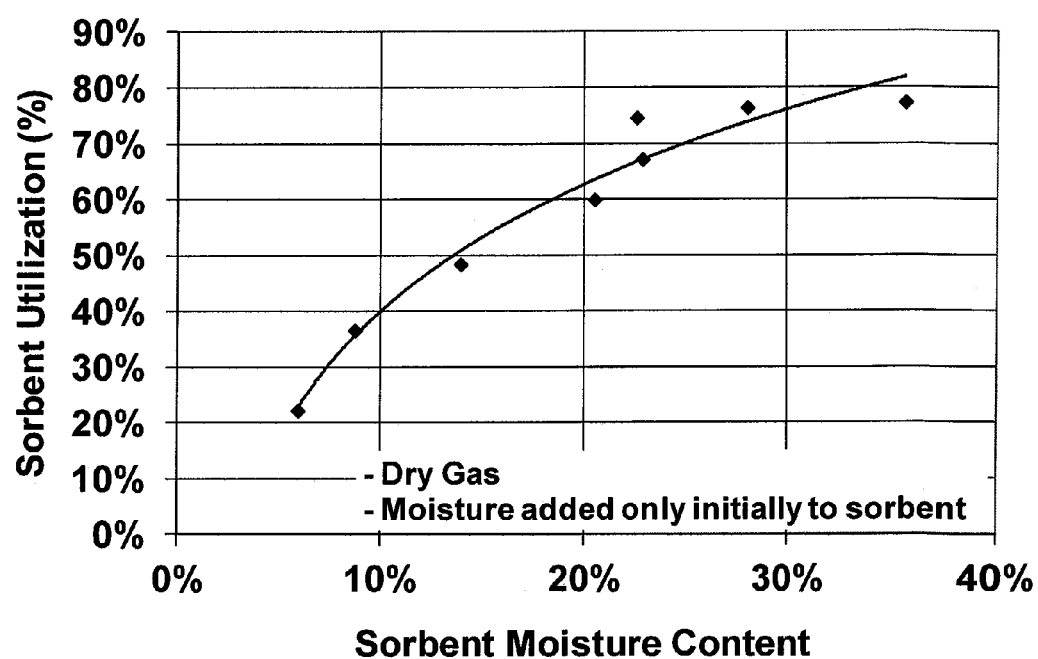
FIGS. 3A and 3B illustrate results of an experiment with selected amounts of initial moisture in the sorbent material, with FIG. 3A illustrating that $CO_2$ capture increases with the increased amount of moisture in the sorbent and FIG. 3B illustrating that in the tests performed, while the utilization of the sorbent was increased from 22% to 80%, the heat of reaction was still between −5 and −60 kJ/mol $CO_2$.
Figure 3B:
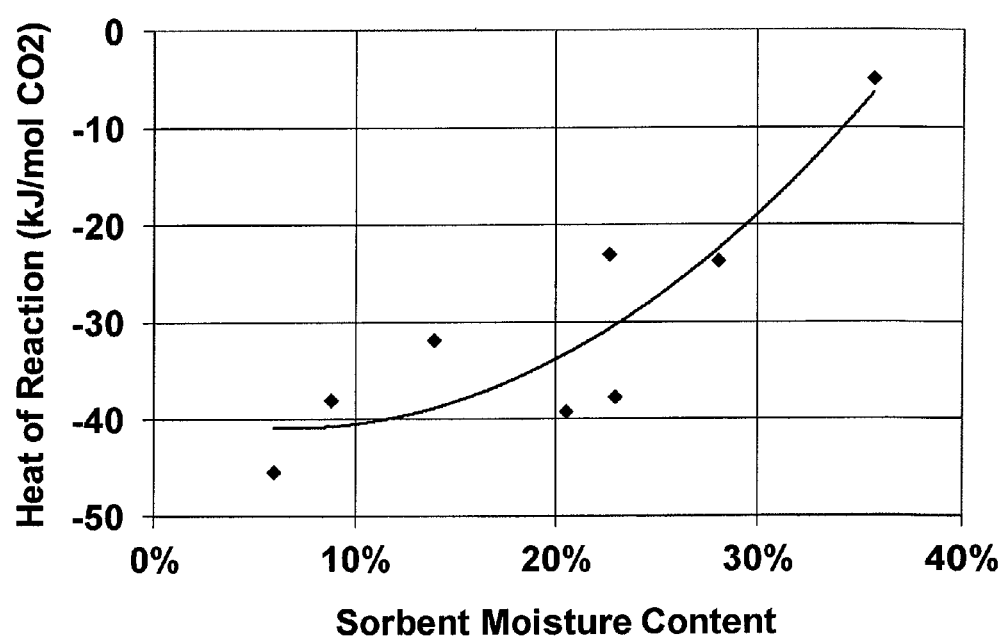

Results of an experiment with selected amounts of initial moisture in the sorbent material are shown in FIGS. 3A and 3B. In these tests, no moisture was added to the gas; all the moisture for the $CO_2$ capture reaction had to originate from the sorbent (adsorbed). In addition, once the water in the solid sorbent evaporated, the reaction stopped. At low moisture contents, the extent of the $CO_2$ capture is low, and increases with the increased amount of moisture in the sorbent. In the tests performed, the utilization of the sorbent was increased from 22% to 80% (FIG. 3A).

However in all of these cases, the heat of reaction was still between −5 and −60 kJ/mol $CO_2$, (see FIG. 3B), confirming that this adsorption was a "hybrid" adsorption process. Without being bound by theory, we expect a portion of the adsorbed water to be partially tied as a carbonate hydrate. The preferred sorbent moisture content is between about 5 and 25 percent by weight of the sorbent (FIG. 3B) to obtain the benefit of high $CO_2$ adsorption rates, high $CO_2$ adsorption capacity and low $CO_2$ heat of adsorption. Tests with such materials indicate that we can employ such sorbents and still have good handling characteristics.

Figure 4:
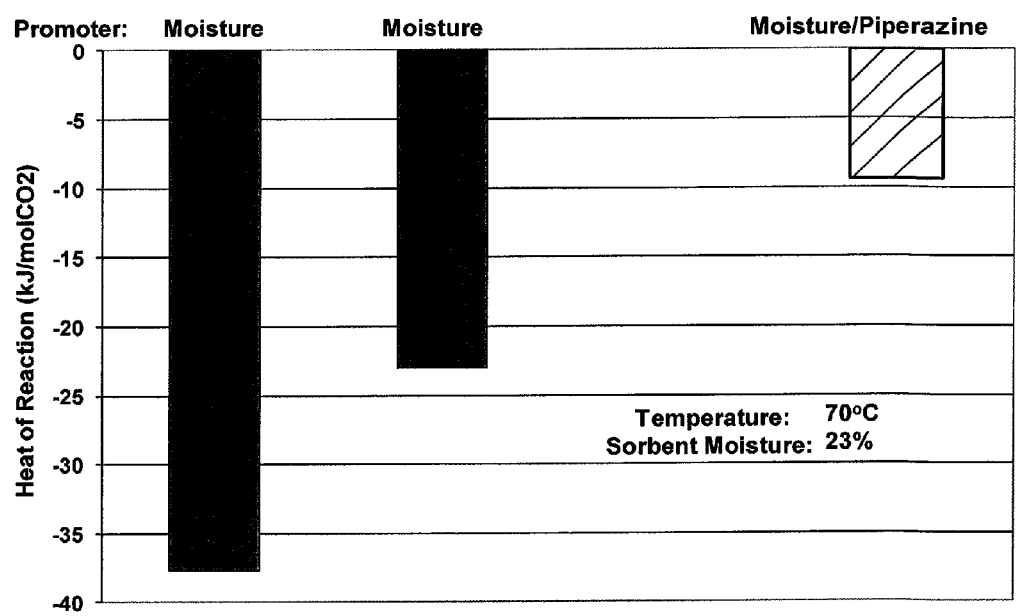
FIG. 4 shows that the heat of adsorption with the piperazine-containing sorbent material is low compared to higher values with identical water promoter concentrations without piperazine.

Addition of the promoter to the sorbent composite also provides significant advantages. A hybrid sorbent material was prepared using 1 mm activated carbon particles as the support material. This was impregnated with potassium carbonate as the active alkaline component. The amount of potassium carbonate was about 50 weight percent. Piperazine was added as solution (water-based) to the above sorbent particles to achieve about 23 weight percent of water content in the sorbent particles. The piperazine was about 2 percent by weight of the sorbent particles. This sorbent material was subjected to $CO_2$ adsorption testing in TGA/DSC apparatus at the adsorption temperature of 70° C. The utilization of the active alkaline component (i.e., amount of carbonate converted to bicarbonate) was about 64% with the piperazine-containing sorbent material. This is similar performance to sorbent material with just water as the promoter; the utilization in those cases were between 65 and 75%. However, the heat of adsorption with the piperazine-containing sorbent material was −9.4 kJ/mole of $CO_2$ adsorbed (FIG. 4). This compares to values of heat of adsorption of 23 and 37.7 kJ/mole of $CO_2$ adsorbed for the hybrid sorbent composition with identical water promoter concentrations (FIG. 4).

In a practical system, the adsorber is operated with material that has physically adsorbed moisture, but with a value low enough that the material is easily handled. In one scale-up configuration of a circulating fluid bed, the above data suggest that a portion of the sorbent should be recycled (to be able to achieve high sorbent utilization) before being sent to the regenerator section. Also, in an operating mode, humidification of the sorbent is performed prior to recycling to the adsorber to rejuvenate the sorbent to maintain high sorbent utilization (>90% of stoichiometry).

Reaction Rates

Figure 5:
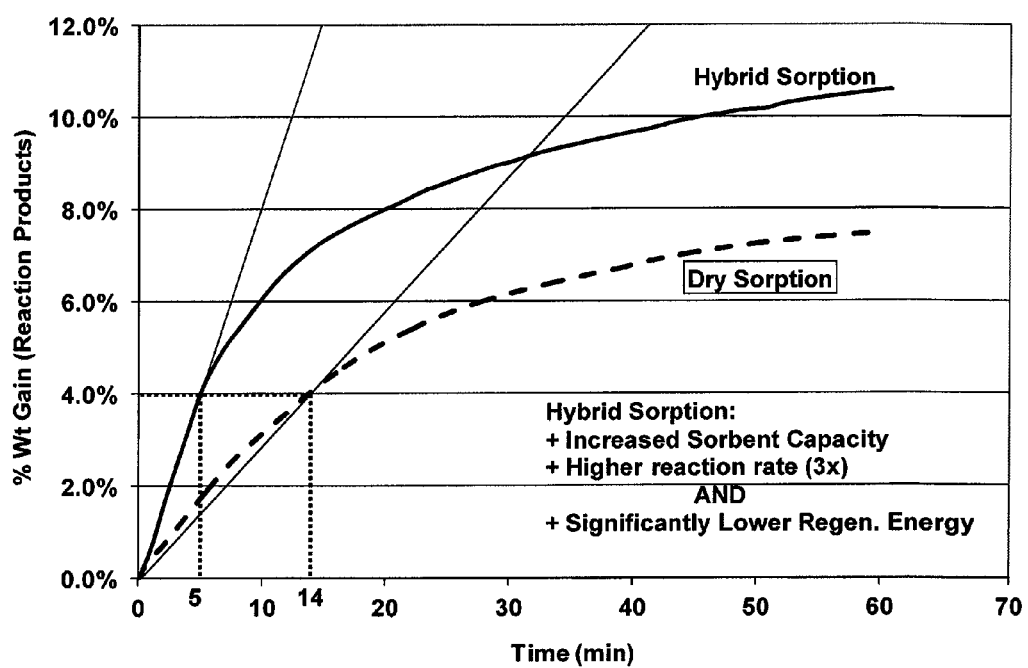
FIG. 5 illustrates the reaction rates of $CO_2$ sorption with the hybrid sorbent as compared to traditional dry sorbent.

The TGA data were used to compare the reaction rates of $CO_2$ sorption for the hybrid and dry processes (FIG. 5). The baseline evaporation rates in $N_2$ with the same amount of materials and gas flows and other process conditions were used to back out the extent of $CO_2$ capture. The hybrid adsorption process (water supplied as reactant in the condensed phase) is three times faster than the adsorption when the water is supplied as a reactant in the vapor phase.

In the design of an adsorber, high $CO_2$ removals with short solids residence times (multiple recycle loops for the solids) can be expected if the sorbent is hydrated prior to introduction into the reactor after each return loop from the cyclone (recycle).

Figure 6A:
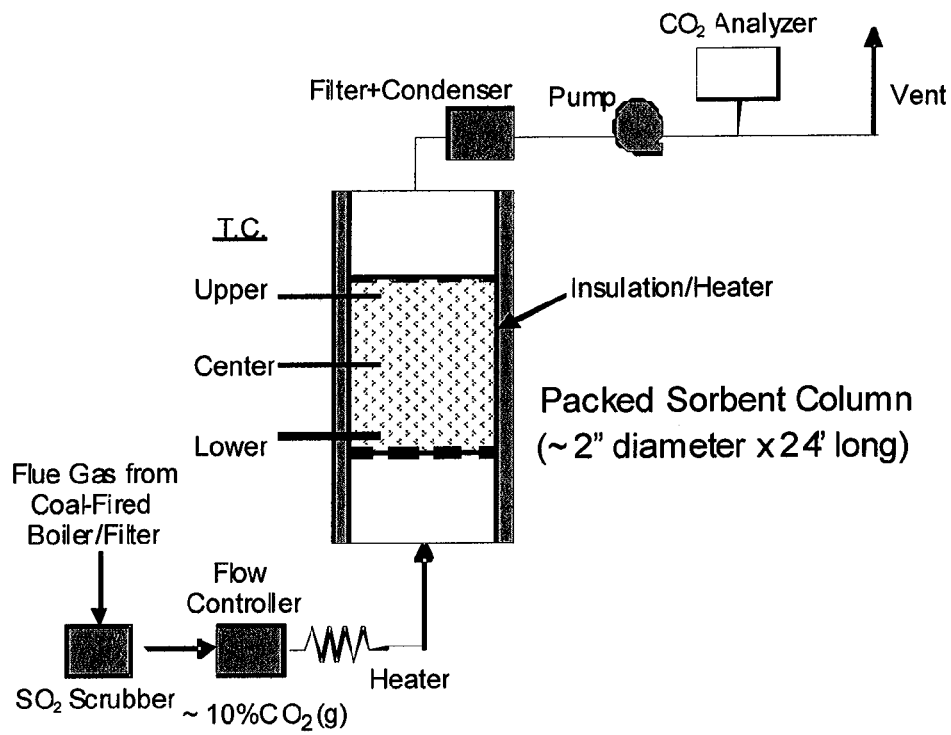
FIGS. 6A and 6B are schematic illustrations of fixed bed adsorption and desorption systems, respectively.
Figure 6B:
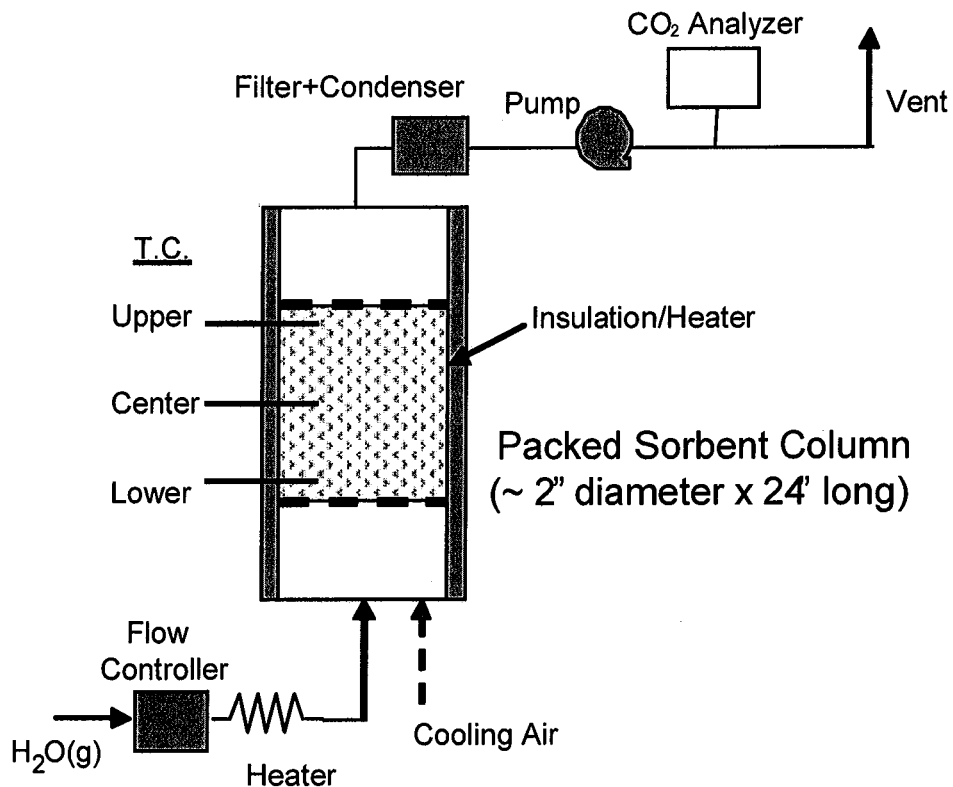
Figure 7A:
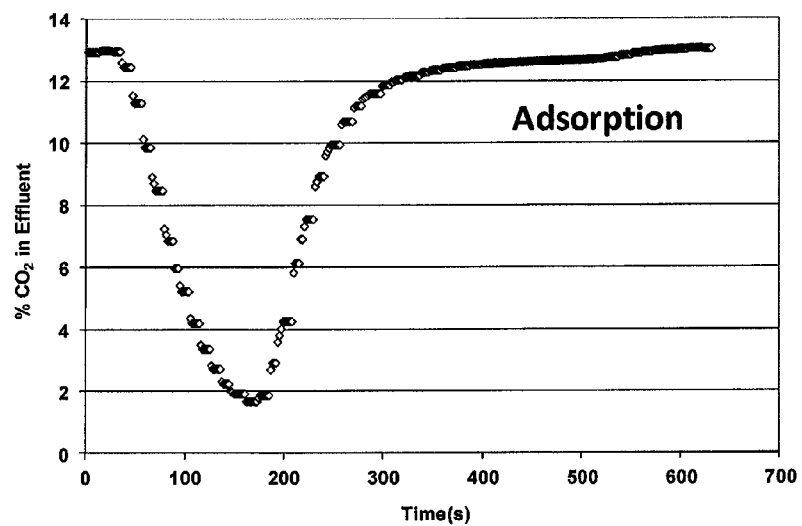
FIGS. 7A-7D illustrate certain test results from adsorption and desorption processes.
Figure 7B:
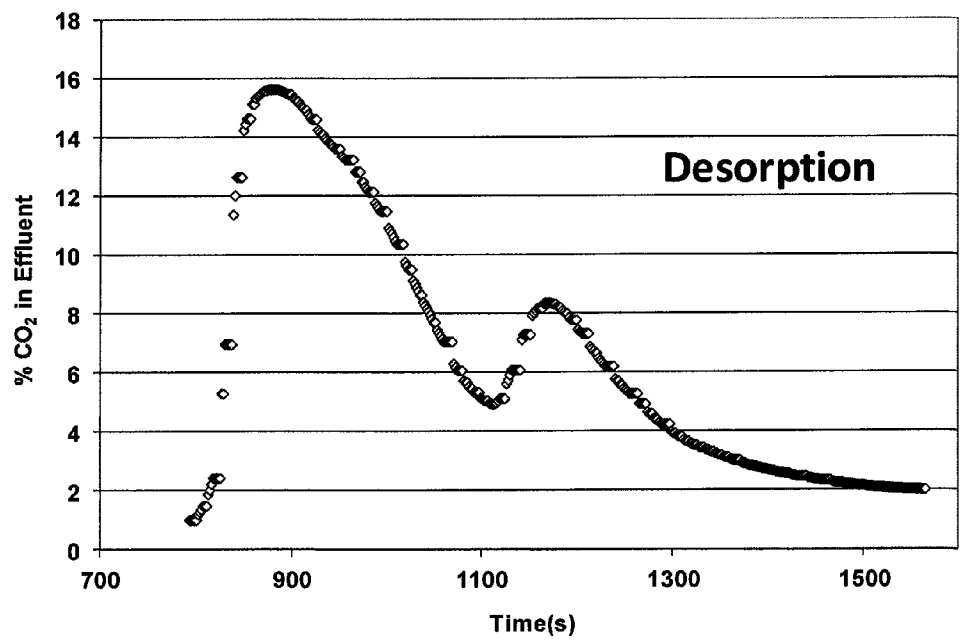
Figure 7C:
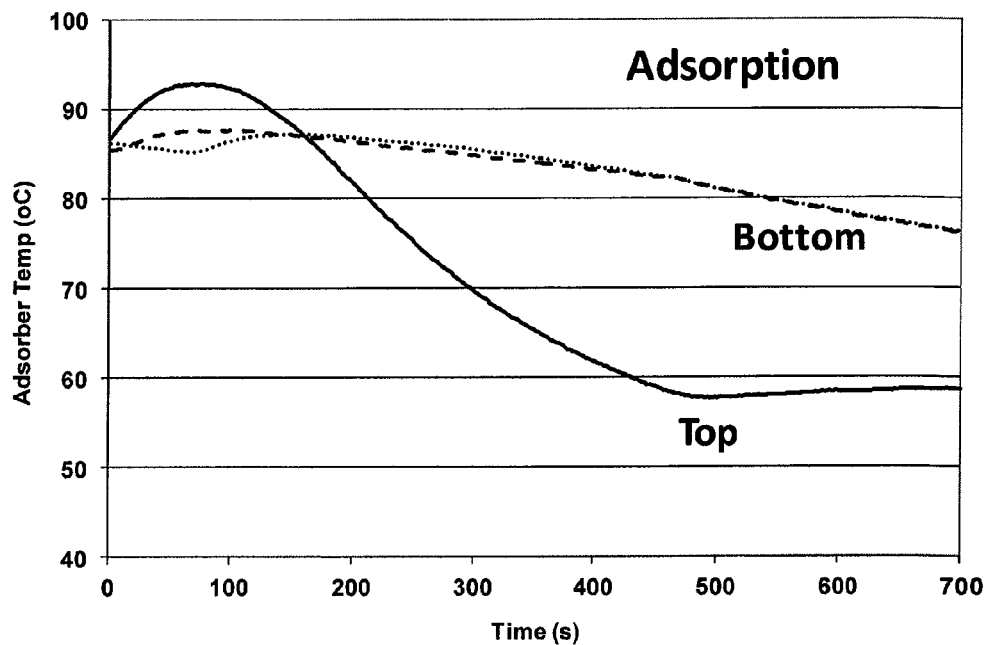
Figure 7D:
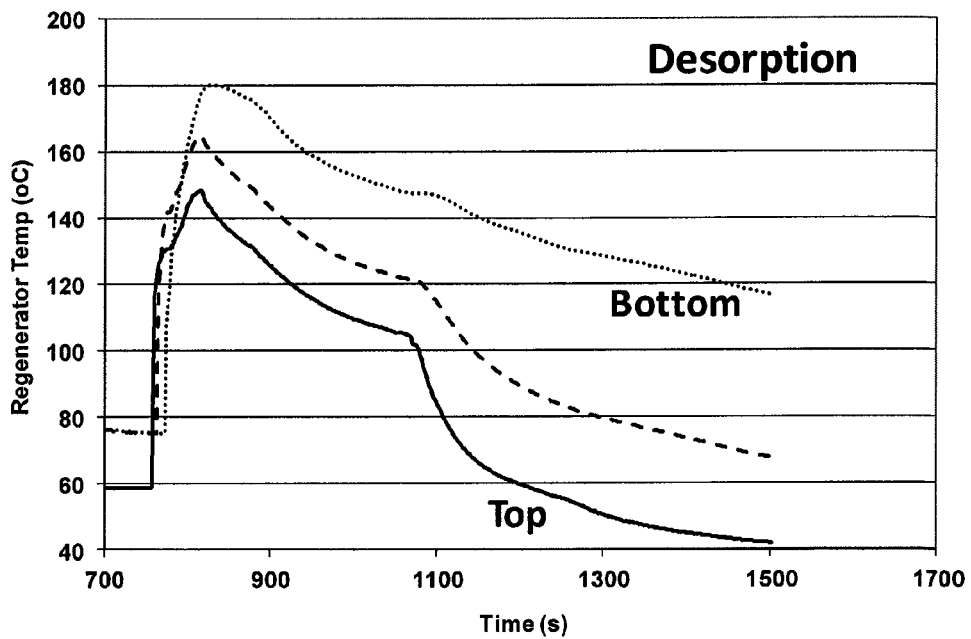

Regeneration and Results from Fixed Bed Testing:

The regeneration step can be carried out in a steam environment to preserve the hydrated nature of the sorbent and to realize the low regeneration energy that corresponds to the low energy of hybrid $CO_2$ adsorption. A fixed bed test set-up was used to evaluate the regeneration step of the process (steam-rich environment and pressure from 1-6 bar). FIGS. 6A and 6B are schematic diagrams of the fixed bed test system.

The fixed bed facility used in the tests was supplied with steam from a steam generator for the sorbent heating and regeneration step. The temperature of the regeneration step was controlled by the (saturated) steam pressure. A temperature of about 150-160° C. and a pressure of about 80 psi (about 6 bar) could be achieved with this set-up.

Figure 8:
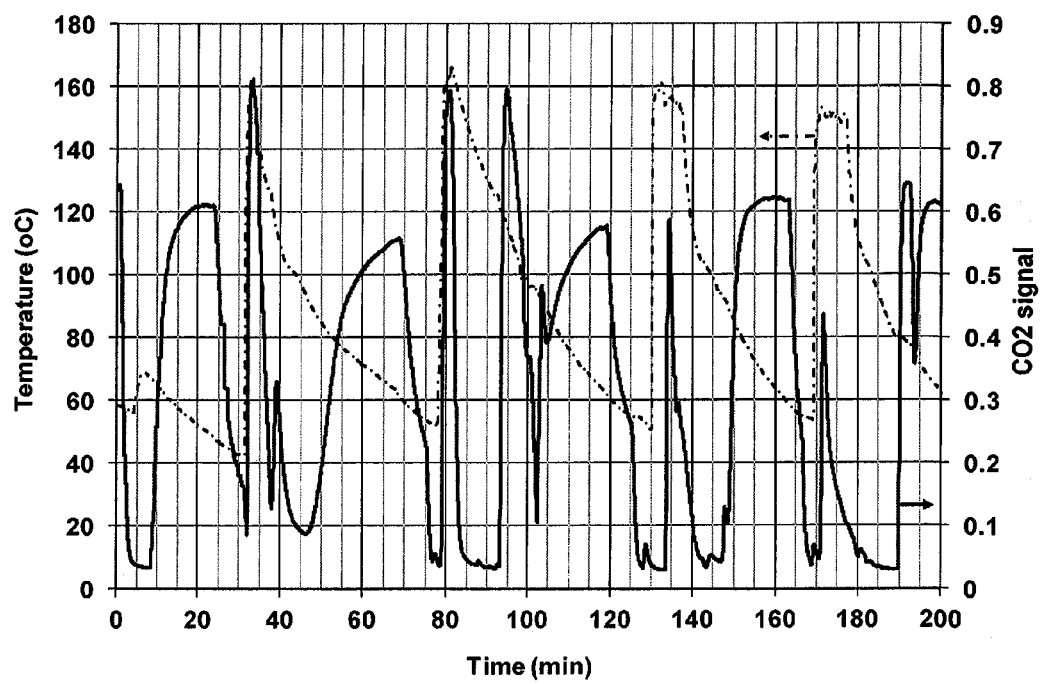
FIG. 8 illustrates results from a multi-cycle test.

Results of $CO_2$ adsorption and desorption processes from the fixed-bed test system used to simulate the subject hybrid sorption process are shown in FIGS. 7A-7D and from a multi-cycle test are shown in FIG. 8. During the adsorption step, $CO_2$ is captured as seen by the decrease in the outlet $CO_2$ concentration. Also note the increase in the bed temperature indicating the wave of adsorption as it travels down the bed, once the upper portions of the bed is consumed. During the regeneration step, steam at about 80 psi and 160° C. is introduced to the top of the bed. The introduction of the steam rapidly increases the temperature of the bed and the $CO_2$ is released from the sorbent. The steam flow was stopped after 2 minutes. The pressure was maintained at 80 psi as the $CO_2$ was released. Integrating the amount of $CO_2$ adsorbed versus the $CO_2$ released showed that 65% of the adsorbed $CO_2$ was released in this step. Introduction of nitrogen (no heat provided) subsequently removed the remainder of the $CO_2$ (100% regeneration) suggesting that the $CO_2$ was trapped between the particles in the bed.

Without being bound by theory, it is expected that the energy of the regeneration is very low (0-60 kJ/mol $CO_2$). Such a low value is consistent with heats of reaction [2 $KHCO_3$+0.5$H_2O$=$K_2CO_3$*1.5$H_2O$+$CO_2(g)$] extrapolated to the regeneration temperatures. In the preferred mode for regeneration, water evaporation should be kept low, and the water is preferably reacted to form carbonate-hydrates/carbonate "solution" in the pores of the sorbent (both reactions are exothermic) to counter the endothermic decomposition to release $CO_2$.

A method of capture of $CO_2$ by a hybrid sorbent may be summarized as follows:

1. The energy required during regeneration of the sorbent is minimized by a wet sorption and desorption process using the hybrid sorbent.
2. The process chemistry using a moist sorbent (sorbent with "condensed" water, either adsorbed or bulk) and using contactor conditions (temperature and contact time between the sorbent and $CO_2$-containing gas) that substantially maintains the state of the sorbent with at least some "condensed" water. This process chemistry minimizes sorbent-$CO_2$ heat of reaction, promotes fast $CO_2$ capture, and uses an effective and low cost method of heat management.

Figure 9:
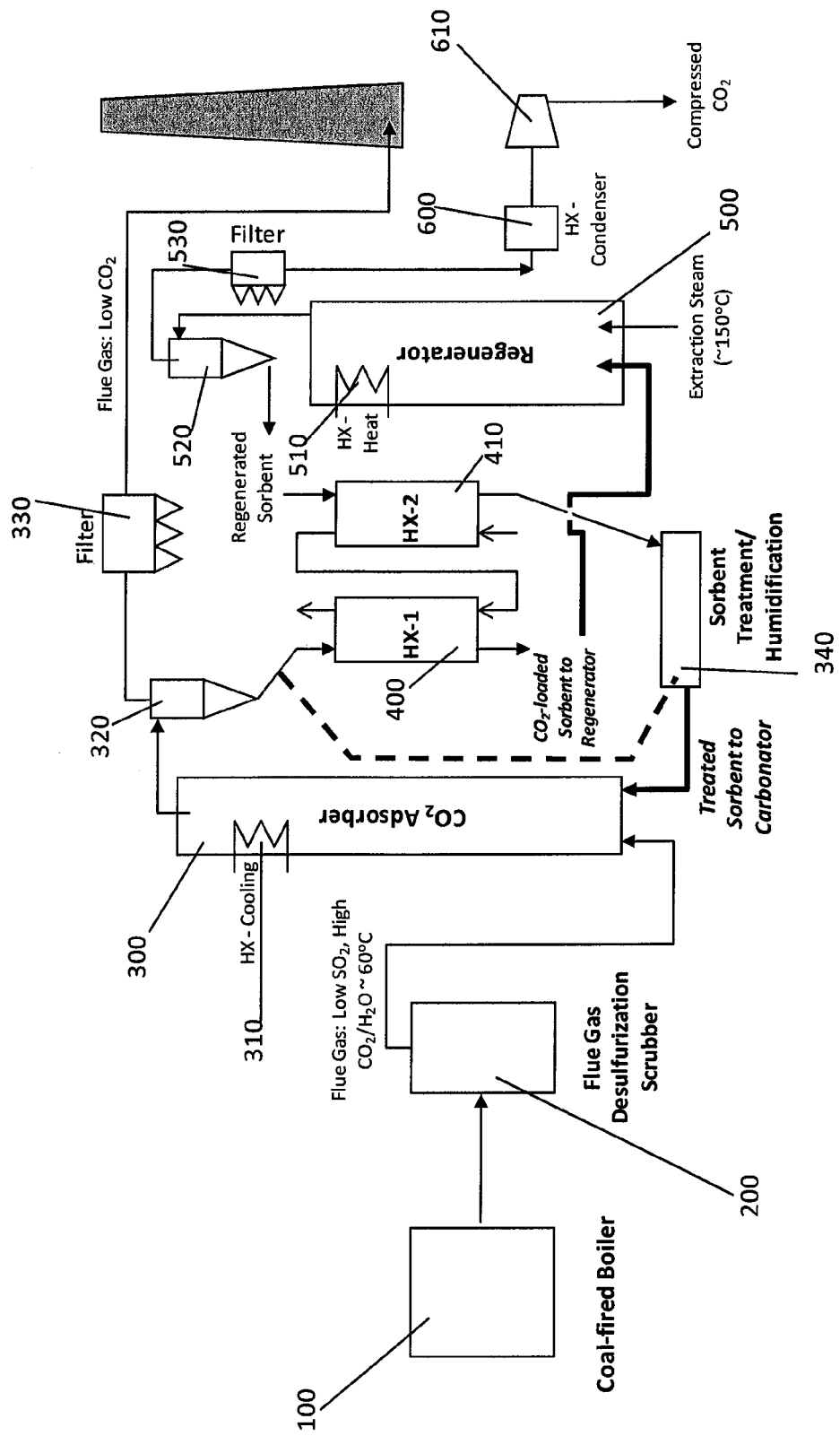
FIG. 9 illustrates a system for capturing $CO_2$ by hybrid sorption.

One system for implementing the hybrid sorption process is shown FIG. 9. In an example of the flue gas composition (Table 2), the subject process can be used to capture $CO_2$ from flue gases exiting a desulfurization scrubber with high sorption capacity, fast kinetics, and low regeneration energies. Flue gas from a typical pulverized coal boiler (100) firing a typical U.S. bituminous coal (Illinois No. 6) with the associated pollution controls for nitrogen oxides, particulate matter, Hg, and sulfur oxides will typically have a composition as shown in Table 2. The subject process and system are also applicable to other gas streams containing $CO_2$ from combustion of gaseous fuels like natural gas in devices such as gas turbines.

TABLE 2

Normal Flue Gas Composition after Pollution Controls (dry basis).

| Dry Flue Gas Composition | Composition of Flue Gas Exiting FGD System |
|---|---|
| $CO_2$ | 15.9 vol% |
| $N_2$ | 81.3 |
| $O_2$ | 2.8 |
| Nitrogen Oxides | ~80 ppmv |
| Sulfur Oxides | ~45 ppmv |
| Moisture | 17 vol % |
| Particulate Matter | ~9 ppmw |
| Mercury (Hg) | ~1.2 ppbw |

In the above example (FIG. 9), flue gas from a desulfurization scrubber (200) connected to a coal-fired boiler, with relatively low $SO_2$ (~45 ppmv), high humidity and $CO_2$ (~15.9%) levels, enters the adsorber section of the process (300). The subject process comprises the following steps:

I. Adsorption: $CO_2$ in the flue gas is absorbed by the hybrid sorbent in the adsorber (300). The adsorber can be a fluidized bed design or a transport reactor, for example. Sorbent that can be fluidized (~100-2000 μm) is introduced into the adsorber and contacts the flue gas in a co-current manner. Adsorption of $CO_2$ is an exothermic process. In the hybrid sorption process, the adsorber temperature is primarily controlled by adding humidified sorbent to the reactor and allowing a portion of the moisture to evaporate. This is a good method as the cooling occurs in the particles, where the adsorption processes are taking place, thus ensuring maximum $CO_2$ capacity for the sorbent. A heat exchanger (310) may also be located inside the adsorber to extract energy from the reacting sorbent particles to supplement the cooling resulting from water evaporation. The temperature in the adsorber is anticipated to be maintained at about 50-80° C. Another advantage of the humidified sorbent is that the hydrated version of the active component in the sorbent is preserved. It is the hydrated component of the alkali species that exhibits a higher capacity for $CO_2$ than the dry alkaline sorbent, and a faster reaction kinetics and lower heats of reaction (<~60 kJ/mol $CO_2$ versus 140 kJ/mol $CO_2$) compared to the dry sorbent.

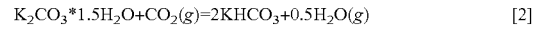

$$K_2CO_3*1.5H_2O+CO_2(g)=2KHCO_3+0.5H_2O(g) \quad [2]$$

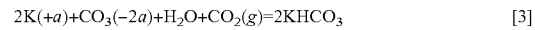

$$2K(+a)+CO_3(-2a)+H_2O+CO_2(g)=2KHCO_3 \quad [3]$$

Without being bound by theory, it is believed that the above reactions occur in the hybrid adsorption process.

The $CO_2$-loaded, drier sorbent is separated with a cyclone (320) and transferred to a "bulk flow heat exchanger" (HX-1) (400). A portion of the separated sorbent may be recycled to the adsorber; recycled sorbent may be humidified in a sorbent treatment/humidification section (340) prior to reintroduction to the adsorber. The $CO_2$-depleted gases leaving the cyclone (320) are cleaned further in a filter (330), such as a baghouse, before being discharged to the environment. Additionally, the sorbent particles collected in the filter (330) may be combined with water and other sorbent constituents, such as binders, and the resulting slurry sprayed onto and combined with the sorbent returning to the adsorber. This step may be performed in the sorbent treatment/humidification section (340) or at the inlet of the adsorber (300).

II. Sorbent Heat Exchange: A second aspect of the process is pre-heating the sorbent from the adsorber prior to the regeneration step. For example, the sorbent with adsorbed $CO_2$ is partially heated in a bulk flow heat exchanger (400) with a heat transfer fluid couple. The heat exchanger is of a design for example, provided by Solex Thermal Sciences Inc. The heat transfer fluid is heated in a parallel heat exchanger (HX-2) (410) that cools the regenerator discharge sorbent material. The use of a heat transfer fluid couple improves the overall heat efficiency of the process. A portion of the $CO_2$ may be released in the heat exchanger (HX-1), which can be easily recovered for further processing.

III. Regeneration: The "warm" $CO_2$-loaded sorbent from HX-1 (400) is transferred to a regenerator (500), which can be another bulk-flow heat exchanger or a bubbling fluid bed. If a bulk-flow heat exchanger design is used, the three hardware elements (HX-1, regenerator, and HX-2) can be advantageously arranged on top of each other and gravity used to transfer material from one section to the next and through the sections. One aspect of regenerator operation is that it be performed in a high water vapor concentration environment (e.g., steam). This is necessary to regenerate the active component as a hydrate. Another aspect is potential operation of the regenerator/heat exchangers under pressure to foster sorbent hydration and low regeneration heats of reaction. Also, water may be added to the sorbent prior to its transport to the regenerator to provide an initial moisture condition to favor the formation of a hydrate during the regeneration step. Heat transfer surfaces (510) are also included in the regenerator to provide indirect heating to the sorbent and minimize the fluidizing steam. This heat exchanger (510) can be of a condensing type with pressurized steam to achieve the relevant regenerator temperatures, which are expected to be about 150° C. The regenerated sorbent particles are directed to a heat exchanger (HX-2) (410) for sorbent cooling. The gases exiting the regenerator are $CO_2$ and $H_2O$, are separated via cooling and condensation and attended heat recovery in a heat exchanger (600). Steam raised in this step can be compressed and re-used in the process or used for additional power generation. The recovered $CO_2$ is compressed using a multi-stage compression system with inter-cooling (610), and made ready for transport. The $CO_2$-rich gases leaving the cyclone (520) are cleaned further in a filter (530), such as a baghouse, before being discharged to the heat exchanger-condenser (600). Additionally, the sorbent particles collected in the filter (530) may be combined with water and other sorbent constituents, such as binders, and the resulting slurry sprayed onto and combined with the sorbent being used in the process.

IV. Sorbent Humidification: Another aspect of the hybrid sorption process is that the regenerated sorbent exiting the sorbent heat exchanger (HX-2) can be humidified further to impart a certain moisture content to the material and achieve all the positive benefits of a moist sorbent with an active carbonate hydrate form. The moisture content should be maximized but limited to a value such that the sorbent will still retain good handling and flow characteristics. It is anticipated that the moisture content of sorbent post-humidification will range from about 10 to about 20 percent. Paddle mixer-type equipment may be used for handling large sorbent quantities and to help achieve uniform humidification.

V. Sorbent Bleed: A very small bleed stream of the circulating sorbent can be processed to recover mainly potassium sulfate, ammoniated species (if amine-based promoters are used) and support material—which can be converted beneficially to a fertilizer product.

VI. Sorbent Formulation: The hybrid sorbent is a composite with physical and chemical functionalities required to meet the process objective comprising the following:
 a. Active alkaline components when combined with water that react with $CO_2$ but with low heats of reaction; examples are alkali carbonates ($Na_2CO_3$, $K_2CO_3$), bicarbonates ($NaHCO_3$, $KHCO_3$), mixed carbonate-bicarbonate (trona), hydrates (potassium carbonate hydrate-$K_2CO_3*1.5H_2O$). Other examples are amines (e.g., mono-ethanolamine, diethanolamine, piperazine), amine groups covalently bonded to the substrate material, and ammoniated compounds.
 b. Water (adsorbed) but limited so that the sorbent is maintained as a flowable powder.
 c. Promoters to activate the alkali component; such as amines, piperazine, alkali carbonates, and that are complementary to the active alkaline components.
 d. Porous, attrition-resistant support for the active alkaline component, water and promoters; examples include porous silica, zirconia, alumina, char, activated lignite char, activated carbon.
 e. Binders, to impart strength to the final sorbent particle; examples include bentonite, pozzolanic compounds such as calcium silicates, Portland cement, organic resin.

Figure 10:
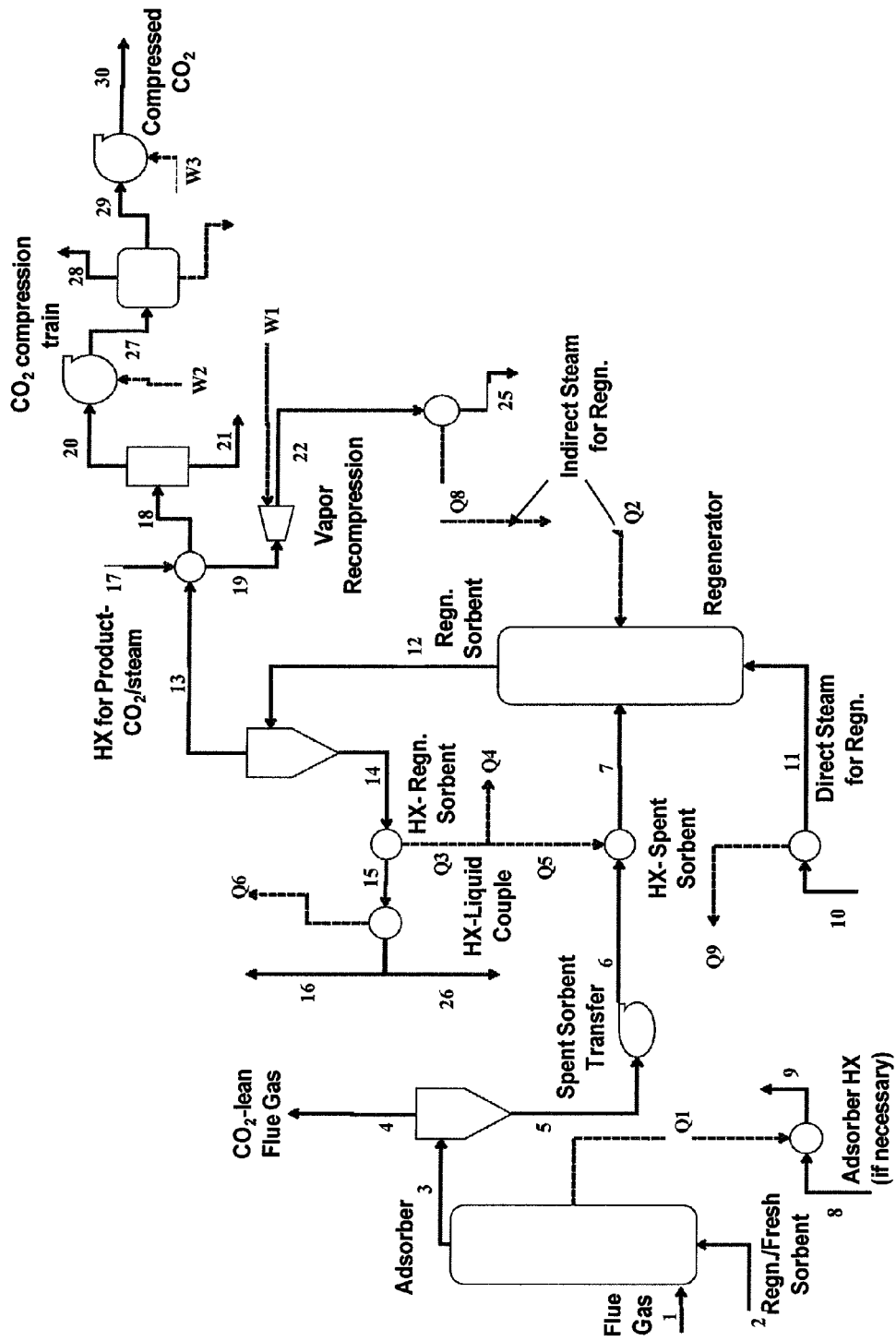
FIG. 10 illustrates a different system for capturing $CO_2$ by hybrid sorption.

A detailed example of the of hybrid sorption process, modeled using a process analysis program (ASPEN Plus™), is described below. The basis for this model was a nominal 100 $MW_e$ plant firing lignite coal (1000 MMBtu/hr coal firing) and equipped with a wet scrubber. Gases leaving the scrubber are sent to a booster fan (~1.15 bar). FIG. 10 illustrates a general process flow diagram identifying the major process equipment, material and energy balances around the $CO_2$ capture and compression system components. Table 3 includes stream tables for the system of FIG. 10, including operating temperatures and pressures.

TABLE 3

| Stream Number | 1 | 2 | 3 | 4 | 5 | 6 | 7 |
|---|---|---|---|---|---|---|---|
| Identity | Sorbent | Fluegas | Flue + Sorbent | Clean Flue Gas | Lsed Sorbent | Pressurized Used Sorbent | Heated Sorbent |
| Flow [lbmol/hr] | 98484 | 36294 | 130553 | 31218 | 99336 | 99336 | 99336 |
| Temp [° F.] | 140 | 140 | 158 | 158 | 158 | 159 | 274 |
| Pressure [psia] | 14.7 | 14.7 | 14.7 | 14.7 | 14.7 | 105 | 105 |

TABLE 3-continued

| Stream Number | 8 | 9 | 10 | 11 | 12 | 13 | 14 |
|---|---|---|---|---|---|---|---|
| Identity | In-Adsorber Cooling H2O | Out-Adsorber Cooling H2O | Regenerator H2O | Regenerator Steam | Regenerated Sorbent + Gas | Released Gases | Regenerated Sorbent |
| Flow [lbmol/hr] | 23869 | 23869 | 2886 | 2886 | 106447 | 7855 | 98593 |
| Temp [° F.] | 41 | 153 | 153 | 335 | 295 | 295 | 295 |
| Pressure [psia] | 14.7 | 14.7 | 105 | 105 | 100 | 100 | 100 |

| Stream Number | 15 | 16 | 17 | 18 | 19 | 20 | 21 |
|---|---|---|---|---|---|---|---|
| Identity | Cooled Regn. Sorbent | Regn. Sorbent Gases | H2O-for Regn Heating | Released CO2 and H2C | Heated Water [Regn, Heating] | CO2 Stream | H2O Stream |
| Flow [lbmol/hr] | 98593 | 36.6 | 3996.6 | 7855 | 3996.6 | 4104 | 3751 |
| Temp [° F.] | 180 | 140 | 122 | 140 | 279 | 128 | 128 |
| Pressure [psia] | 100 | 14.7 | 48 | 100 | 48 | 48 | 48 |

| Stream Number | 22 | 25 | 26 | 27 | 28 | 29 | 30 |
|---|---|---|---|---|---|---|---|
| Identity | Pressurized Steam | Condensed Steam | Sorbent Recycle | Compressed Gas Stream | Flashed Liquids after stage 4 | Liquid CO2 Stream | Pumped CO2 |
| Flow [lbmol/hr] | 3996.6 | 3996.6 | 98555 | 3933.8 | 170.2 | 3933.8 | 3933.8 |
| Temp [° F.] | 412 | 310 | 140 | 238 | 86 | 86 | 125 |
| Pressure [psia] | 80 | 80 | 14.7 | 1124 | 1124 | 1124 | 2176 |

| Q1 | Q2 | Q3 | Q4 | Q5 | Q6 | W1 | Q8 | Q9 | W2 | W3 |
|---|---|---|---|---|---|---|---|---|---|---|
| 45.2 MMBTU/hr | −110.7 MMBTU/hr | 94.8 MMBTU/hr | 23.7 MMBTU/hr | 71.1 MMBTU/hr | 30.2 MMBTU/hr | −1739 hp | 63.6 MMBTU/hr | −56.7 MMBTU/hr | −8187 hp | −522 hp |

| Heat duty for regen | | | Heat duty for regen | | | |
|---|---|---|---|---|---|---|
| −98.8 MMBTU/hr | 4000 bmolCO2/hr | 1816000 mol CO2/hr | −57.36 kJ/mol CO2 | | | |

Certain physical elements in a hybrid sorption process are as follows:

1. Adsorber: Flue gas pressure is boosted for introduction into the adsorber. The adsorber may be designed as a fluidized bed/transport reactor with solids recycle. In this example, the adsorber is maintained at 70° C.; so some heat needs to be extracted (Q1). In an alternate embodiment, with provision of sufficient quantity of water associated with the solid sorbent, all of the exothermic heat of the carbonation reaction is balanced by the endothermic heat of water evaporation from the sorbent particles. No heat would need to be extracted in this embodiment; the reactor temperature would be maintained at around 75° C. The equipment design of the adsorber can therefore be significantly simplified with the hybrid sorption method and heat transfer surfaces within the adsorber would not be required.

The adsorber may be of a design similar to a circulating solids scrubber for $SO_2$ capture. In the case of a circulating solids scrubber design, the sorbent particles with the adsorbed $CO_2$ are separated from the gases in a mechanical device such as a cyclone. A portion of the separated solids may be returned to the adsorber, while the remainder is directed to a heat exchanger and a desorption section for heating and regeneration. Recirculation of the solids to the adsorber is employed to improve sorbent utilization and to increase the loading of $CO_2$ in the sorbent particles. In another example of the process, prior to re-introduction of the sorbent solids into the adsorber the sorbent particles are humidified (not shown in figure) to improve sorbent utilization and enhance reaction kinetics. For the above 100 $MW_e$ simulation, the sorbent flow rate to the adsorber was about 1000 tons per hour capturing about 100 tons per hour of $CO_2$.

2. Sorbent Heat Exchanger: The cold sorbent leaving the adsorber is heated in a heat exchanger to a temperature that is near that of the regenerator operation. The heat exchanger may be of a moving bed such as the bulk-flow heat exchanger provided by Solex Thermal Sciences Inc. of Alberta, Canada. A fluid couple is used to transfer the heat (Q5 ~71 MMBtu/hr) from the hot regenerated sorbent. This process and equipment design facilitates increased process efficiency by recouping a significant portion of the sensible heat differential between regeneration and adsorption temperatures.

3. Regenerator: The regenerator in the subject process is designed to use both direct steam and indirect steam for heat transfer and operates at around 150° C. In this manner, meeting the heat duty requirements can be done independently of controlling the process (gaseous) environment and gas flow in the regenerator. The direct steam provides the $CO_2$-conveying medium and a portion of the heat duty. The indirect steam provides the remainder heat duty (total heat duty: □2, Q8 and Q9 for regeneration is calculated to be 57 kJ/mol $CO_2$). For equipment, the Solex bulk-flow heat exchanger would meet the needs for the regenerator design. In the example simulation, the operation of the regenerator is under pressure (~7 bar).

4. Vapor Recompression: Another aspect of the subject process is the heat recovery of the steam leaving with the $CO_2$ from the regenerator. A heat exchanger is used to recover the heat as a low pressure steam (19), which is compressed (22) similar to a mechanical vapor recompression process. In this manner, a portion of energy input for regeneration can be recycled to the process.

5. $CO_2$ compression: The subject process offers other potential advantages in that the released $CO_2$ may be at an elevated pressure, which reduces the energy required for compression. The $CO_2$ vapor is first compressed to about 1100 psi to change it into a liquid and the liquid then pumped to the desired 2200 psi. The compressor train is equipped with multiple stages of compression and intercooling to reduce overall energy consumption.

6. Parasitic Power and $CO_2$ Capture Cost: The power loss due to auxiliaries, due to compression requirements, and equivalent power loss due to low pressure steam required for sorbent regeneration is described below for the 100 $MW_e$ unit example. The parasitic power consumption is mainly the flue gas blower (2500 hp—not shown in figure); $CO_2$ compression (W2 and W3—8710 hp); steam vapor recompression (W1—1740 hp). Other smaller parasitic power consumers include solids handling units, fans as well as other items. The steam demand (Q9 and Q2) for regeneration is partially met with recycled recompressed steam (Q8) and the net steam demand for this example is 76,500 lb/h or about 7000 $kW_e$ of equivalent power loss. Adding the above parasitic power consumption results in 16,480 $kW_e$ for capture and compression or a loss of about 16.5% in net power output from a plant that originally generated 100 MWe. This is significantly lower than alternative state-of-the-art methods.

What is claimed is:

1. A process for capturing carbon dioxide from a flowing gas stream, comprising:
   i) providing a carbon dioxide sorbent composition comprising a particulate porous support medium that has a high volume of pores, an alkaline component distributed within the pores and on the surface of the support medium, and water, wherein the proportion of water in the sorbent composition is between about 5% and about 35% by weight of the sorbent and the weight percent of the active alkaline component in the sorbent composition is at least 20%; and
   ii) contacting the sorbent and the flowing gas stream together at a temperature and for a time such that some or all of the absorbed water is evaporated from the sorbent when the contact of the sorbent with the flowing gas ceases.

2. The process of claim 1 wherein step ii takes place at from about 50 to about 80 degrees C.

3. The process of claim 1 further comprising regenerating the sorbent composition after the contacting step by releasing at least some of the captured carbon dioxide from the sorbent.

4. The process of claim 3 wherein the regeneration step takes place at from about 130 to about 170 degrees C.

5. The process of claim 3 wherein the pressure of the regeneration step is from about 1 to about 7 bar.

6. The process of claim 3 wherein the regeneration step takes place in a steam environment.

7. The process of claim 3 further comprising adding water to the sorbent after the contacting step and before the regeneration step.

8. The process of claim 3 wherein the regeneration step comprises both direct heating by contacting steam with sorbent to heat the sorbent and indirect heating, and wherein the outside surfaces of the heat exchanger contact the sorbent to heat the sorbent.

9. The process of claim 3 further comprising compressing the released carbon dioxide.

10. The process of claim 3 further comprising heating the sorbent after the contacting step and before the regeneration step.

11. The process of claim 10 further comprising cooling the sorbent after the regeneration step using a heat exchanger and a heat transfer fluid.

12. The process of claim 11 wherein the sorbent after the contacting step and before the regeneration step is heated using a bulk flow heat exchanger and the heat transfer fluid that was used to cool the sorbent after the regeneration step.

13. The process of claim 3 further comprising returning at least some of the regenerated sorbent to the contacting step, to repeat the contacting step.

14. The process of claim 13 wherein water is added to the regenerated sorbent before the contacting step.

15. The process of claim 14 wherein the water is added by spraying onto the regenerated sorbent or condensing steam on the regenerated sorbent.

16. The process of claim 13 further comprising combining the returned, regenerated sorbent with water and other sorbent constituents, and optionally a binder, before repeating the contacting step.

17. The process of claim 1 wherein the alkaline component comprises a component selected from the group consisting of alkali carbonates, bicarbonates, mixed carbonate-bicarbonate, metal-carbonate hydrates, amines and ammoniated compounds.

18. The process of claim 1 wherein the alkaline component is present in the composition at a weight percent of from about 20 percent to about 70 percent.

19. The process of claim 1 wherein the support medium comprises a material selected from the group of materials consisting of activated carbon, coal char, biomass char, lignite char, silica, alumina, titania, aluminosilicate, zirconia, and clay.

20. The process of claim 1 wherein the sorbent further comprises a binder substance selected from the group of substances consisting of bentonite, clay, lime, sodium silicate, a pozzolanic compound, a lignosulfonate, polyvinyl alcohol, methyl cellulose, polyethylene glycol, an organic resin and a starch.

21. The process of claim 1 wherein the sorbent further comprises a promoter substance to activate the alkaline material, wherein the promoter substance is selected from the group of substances consisting of amines, piperazine and alkali carbonates.

22. The process of claim 1 further comprising recirculating some of the sorbent after the contacting step, so as to repeat the contacting step with the recirculated sorbent.

23. The process of claim 22 further comprising combining the recirculated sorbent with water and other sorbent constituents, and optionally a binder, before repeating the contacting step.

24. The process of claim 22 further comprising adding water to the recirculated sorbent before it is contacted with the flowing gas stream.

* * * * *